United States Patent [19]
Komoto

[11] Patent Number: 5,270,497
[45] Date of Patent: * Dec. 14, 1993

[54] ELECTRONIC BALANCE WITH PID CIRCUIT

[75] Inventor: Akira Komoto, Otsu, Japan

[73] Assignee: Shimadzu Corporation, Kyoto, Japan

[*] Notice: The portion of the term of this patent subsequent to May 26, 2009 has been disclaimed.

[21] Appl. No.: 854,934

[22] Filed: Mar. 20, 1992

[30] Foreign Application Priority Data

Mar. 22, 1991 [JP] Japan ................... 3-063137

[51] Int. Cl.$^5$ ............................ G01G 1/38; G01G 3/14
[52] U.S. Cl. ........................... 177/212; 177/210 EM
[58] Field of Search ................... 177/210 EM, 212

[56] References Cited

U.S. PATENT DOCUMENTS

| | | | |
|---|---|---|---|
| 4,189,017 | 2/1980 | Strobel et al. | 177/212 |
| 4,245,711 | 1/1981 | Kunz | 177/212 |
| 4,365,680 | 12/1982 | Gottstein et al. | 177/212 |
| 4,372,406 | 2/1983 | Komoto et al. | 177/212 |
| 4,420,055 | 12/1983 | Grutzediek et al. | 177/212 |
| 4,457,386 | 7/1984 | Schett et al. | 177/212 |
| 4,487,279 | 12/1984 | Komoto | 177/212 |
| 4,549,623 | 10/1985 | Baumann | 177/212 |
| 5,115,877 | 5/1992 | Komoto | 177/212 |

OTHER PUBLICATIONS

*Feedback Control of Dynamic Systems,* Franklin et al., ©1987, May, pp. 45-49, 53-68, and 99-118.

*Primary Examiner*—Benjamin R. Fuller
*Assistant Examiner*—Randy W. Gibson
*Attorney, Agent, or Firm*—Nikaido, Marmelstein, Murray & Oram

[57] ABSTRACT

An electric balance which allows a pulse current to flow through a force coil with pulses having two kinds of duties for each period of control time, and generates an electromagnetic force at the ratio of mixture of these pulses wherein the duties are controlled so as to bring the electromagnetic force into equilibrium with a load weight, thereby enhancing the resolution of pulse current duty and achieving the production of a high-resolution electronic balance at a reduced cost.

4 Claims, 3 Drawing Sheets

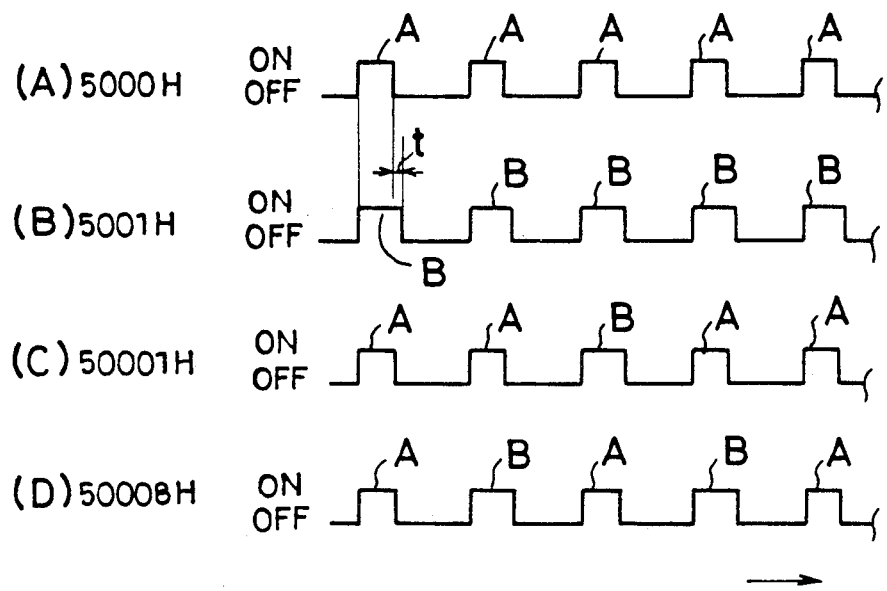
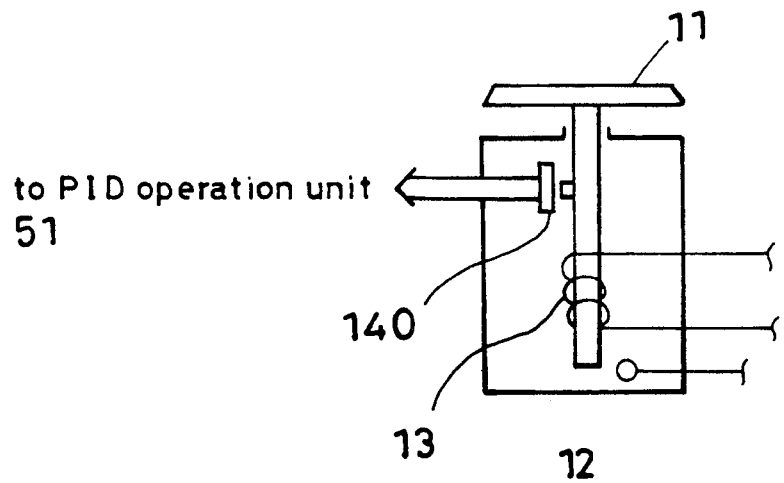

ELECTRONIC BALANCE WITH PID CIRCUIT

BACKGROUND OF THE INVENTION

The present invention relates to an electronic balance and more particularly to an electronic balance of the electromagnetic force balancing type.

In an electronic balance of the electromagnetic force balancing type, an electromagnetic force generated at the time when a current flows in a force coil disposed in a magnetic field, is used as a counterbalance force with respect to the weight of a load to be measured, and the weight of such a load is obtained based on the value of a current required for obtaining an equilibrium between the load weight and the electromagnetic force. The electronic balance of the type above-mentioned may be divided into the following types according to the method of supplying the current to the force coil, the method of measuring the current value and the like:

(1) By changing the duty of a pulse current of about 500 to 1000 Hz using one feedback loop, the electromagnetic force is balanced with the weight of a load, and the pulse width is measured by counting clock pulses passing therethrough.

(2) A pulse current for which any of predetermined N-step duties can be selected, flows in the force coil so that the current is roughly balanced with the weight of a load, and the remaining weight deviation is balanced by a servo system. The value of the current flowing in the force coil is measured by weighted-addition of the pulse duty value selected and the value as obtained by A-D conversion of a PID output in the servo system to each other.

(3) The entire weight of a load is balanced with an electromagnetic force generated by a DC servo system, and the value of a current flowing at the time when such a balance is obtained, is A/D converted.

Out of the conventional methods above-mentioned, the method (1) is disadvantageous in view of limited resolution and response characteristics. More specifically, the cycle of a pulse current flowing in the force coil is limited to about max. 2 milliseconds due to the number of vibrations inherent in the balance mechanism. If the cycle exceeds 2 milliseconds, the balance beam is considerably vibrated. Accordingly, it is required to measure the pulse width changing in this cycle of 2 milliseconds by counting clock pulses. However, even though clock pulses of 30 MHz are used and counted, there is merely obtained max. 60,000 counts (about 16 bits on the binary scale) which is the limit of resolution to be obtained where general-purpose ICs are used.

According to the method (2) above-mentioned, the resolution can be improved. However, the method (2) presents the following problems. That is, in measurement of the weight of a load which undergoes a change from time to time, or in measurement of weighing-out or the like, the pulse duty determined in N steps is changed by one step at the moment when the weight exceeds the range to be measured by the servo system. At this time, there is temporarily produced an excessive force compensation due to the response characteristics of a PID control output of the servo system. This causes the balance mechanism to be swung so that the measured and displayed value is temporarily considerably changed.

The method (3) above-mentioned requires an A/D conversion function with high precision. This requires high stability for both the servo system and the A/D converter. Thus, both the resolution and the stability are hardly assured. In the analog servo mechanism, a certain limit is placed upon integration of the circuit thereof and a number of portions in the circuit should be adjusted. It is therefore difficult to uniformalize the respective performances of electronic balances each using such an analog servo mechanism.

In view of the foregoing, the inventor has already proposed an electronic balance in which (i) pulse currents flow in force coils, (ii) there is fetched, as a digital signal, a signal which represents a displacement of the load receiving member and which is detected for detecting the balancing state of the balance, (iii) this digital signal is subjected to digital PID operations (proportion, integration and differentiation processings), and (iv) the duties of pulse currents to flow in the force coils are determined based on the operation results (Japanese Patent Laid-Open Publication 3-63526).

In the electronic balance according to the proposal above-mentioned, there are generated a plurality of force coil currents respectively having different current values to which different pulse duty data are respectively given. Accordingly, a plurality of pulse currents respectively having different current values (peak values) and different duties are respectively supplied to the force coils. The plurality of pulse currents are made uniform during a predetermined period of control time, and supplied to the force coils in an overlapping state so as to bring the electromagnetic force into equilibrium with the load weight. Then, by weighted-adding these pulse currents flowing through the force coil for the predetermined period of time, the resolution is enhanced.

According to the method above-mentioned, even though the resolution (the number of bits) of each pulse current generating means is limited to a certain level, the total sum of respective resolutions is regarded as the resolution of the balance in its entirety. Thus, the resolution of the balance in its entirety can be advantageously improved as desired by increasing the number of pulse current generating means and the number of divisions of pulse duty data.

However, when this method is adopted in an electronic balance which does not require precision so much, the balance according to the method above-mentioned is disadvantageous in view of cost.

OBJECTS AND SUMMARY OF THE INVENTION

It is an object of the present invention to provide an electronic balance of which resolution is higher than that obtained in any of the conventional electronic balances, likewise in the electronic balance according to the proposal above-mentioned, and which is produced with lower cost than that of the electronic balance according to the proposal above-mentioned.

To achieve the object above-mentioned, the present invention provides an electronic balance in which a pulse current having any of duties determined based on resolution coarser than the display resolution of the balance, is supplied to the force coil. According to the present invention, even if a pulse current having a duty of insufficient resolution is used, a high resolution is achieved for the following reasons:

Pulse currents containing pulses having different duties are supplied to the force coils for each period of control time which is set up by taking into consideration a period of time required for performing a routine of an arithmetic program and other factors. As a result, an intermediate value between the separate values of the different duties is obtained. By changing the mixing ratio of pulses having a larger duty and a smaller duty for each period of control time, a plurality of measured values are obtained between the two separate values which depend upon the resolutions of actual duties. The pulse current duty is determined in the following manner. An output of a displacement sensor for detecting the balancing state of the balance is subjected to automatic control processings such as PID operations and, then converted into pulse duty data in a data processing unit. The pulse duty data is then supplied to pulse current generating means to change the duty of a pulse current supplied therefrom. The display value of the balance is obtained by converting the duty of the pulse current flowing in the force coil, into a mass value.

If a pulse current having duties determined based on resolution coarser than the display resolution of the balance is flown through the force coil without changing the duties thereof in the resolution required for the electronic cannot be obtained. However, when the duties of the pulse current change at a predetermined ratio between a larger value and a smaller value during a predetermined period of control time the value of the current flowing in the force coil in such a period of time is different by a corresponding amount from the value of a current of which duty does not change. Thus, the resolution is improved in a false manner.

For example, when it is supposed that the cycle of the pulse current is equal to 2 milliseconds, a current of 100 pulses flows in the force coil for 0.2 second. The period of time for which the 100 pulses flow through the force coil is set as a period of control time, and when one of the pulses for this period of time is selected and its duty is increased, the average pulse duty in this period of time of 0.2 second is equivalent to the pulse duty at the time when all the pulses are increased by 1/100. Accordingly, the resolution can be substantially improved by two digits. More specifically, when a pulse current having one type of peak value is simply supplied to one force coil and the clock pulse for measuring the pulse width is set to 30 MHz for example, the resolution is limited to about one ten-thousandsth. On the other hand, the balance according to the present invention is improved in resolution to about one millionsth. Unlike in the electronic balance according to the proposal mentioned earlier, it is not required in the electronic balance of the present invention that a plurality of types of pulse currents are generated and supplied to force coils. Accordingly, the electronic balance of the present invention is advantageous in view of cost as compared with the balance according to the proposal mentioned earlier.

In view of disturbance, provision can be made in software such that PID outputs after subjected to averaging processing are converted into pulse duty data, or that a pulse duty signal is formed after execution of such a data processing as not to change the pulse duty for temporary disturbance. Thus, the electronic balance of the present invention is considerably improved in stability of a display value with respect to disturbance as compared with any of the conventional balances.

When provision is made such that a plurality of pulses undergo a change in duty in a predetermined period of time, it is desired in view of reduction in variations of an electromagnetic force to be generated that the pulses changed in duty are dispersed, at regular time intervals, in all the pulses generated in such a predetermined period of time. This facilitates filtering.

BRIEF DESCRIPTION OF THE DRAWINGS

FIG. 3 is a view illustrating the operation of the electronic balance of the present invention;

FIG. 4 is a view illustrating the arrangement of the displacement sensor of electronic balance in accordance with another embodiment of the present invention;

DETAILED DESCRIPTION OF THE PREFERRED EMBODIMENTS

Figure 1:
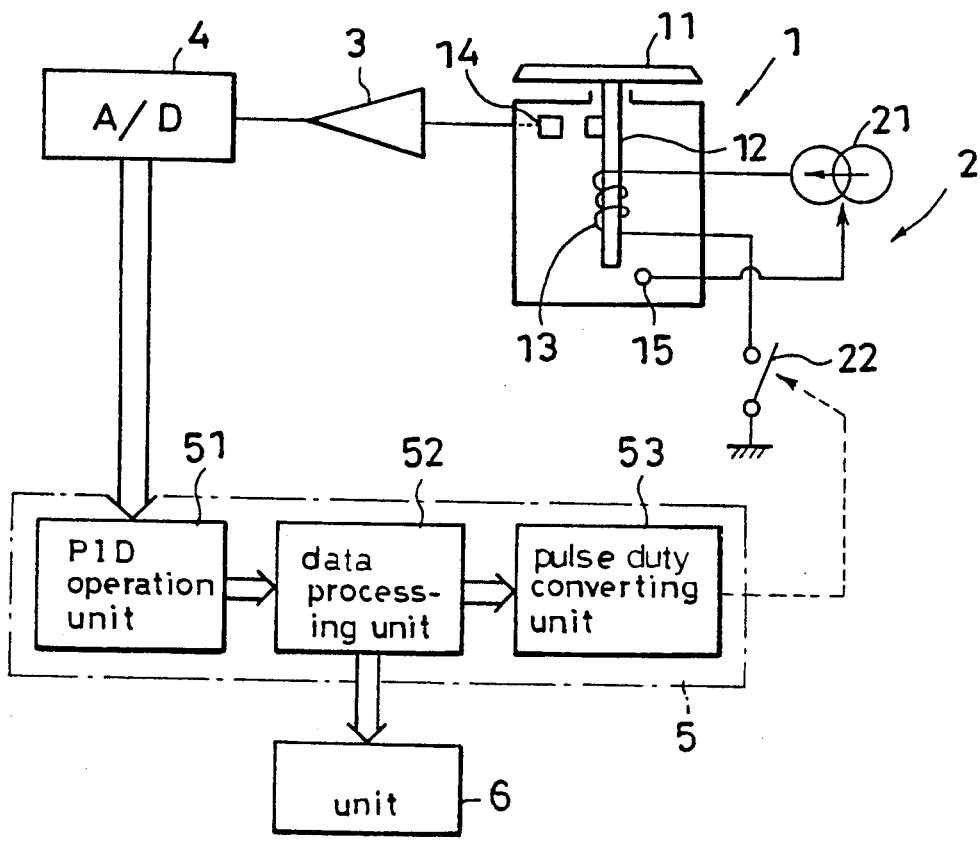
FIG. 1 is a block diagram illustrating the arrangement of an electronic balance in accordance with an embodiment of the present invention.

FIG. 1 is a block diagram illustrating the arrangement of a preferred embodiment of the present invention.

A balance mechanism 1 is a load-weight detecting mechanism of the electromagnetic force balancing type known per se. In this mechanism, a force coil 13 is disposed in a magnetic field formed by a magnetic circuit (not shown). When a current flows in this force coil 13, an electromagnetic force is generated. The electromagnetic force thus generated acts on a load receiving member 12 connected to a plate 11 and is so controlled as to be brought in equilibrium with a load weight W on the plate 11 as set forth below. A movable unit including the plate 11 is preferably regulated in movement in a vertical direction only by a Roberval's mechanism (not shown) (also called a parallel guide).

The equilibrium above-mentioned can be obtained in the following manner. An output of a displacement sensor 14 for detecting a displacement of the load receiving member 12 in the balance mechanism 1 is converted into digital data, which is then processed by a microcomputer 5, to be discussed later, thereby to change the current flowing in the force coil 13.

A signal representing a displacement of the load receiving member 12 as detected by the displacement sensor 14 is amplified by a preamplifier 3, digitalized by an A/D converter 4 and sent to the microcomputer 5. In FIG. 1, the microcomputer 5 is shown in the form of a block diagram as divided by function for the convenience of description. In the respective functional blocks of the microcomputer 5 shown in FIG. 1, there are schematically shown the functions achieved by the microcomputer 5 according to programs stored in a ROM of the microcomputer 5. In fact, the microcomputer 5 comprises conventional hardware such as CPU, ROM, RAM and the like.

Figure 2:
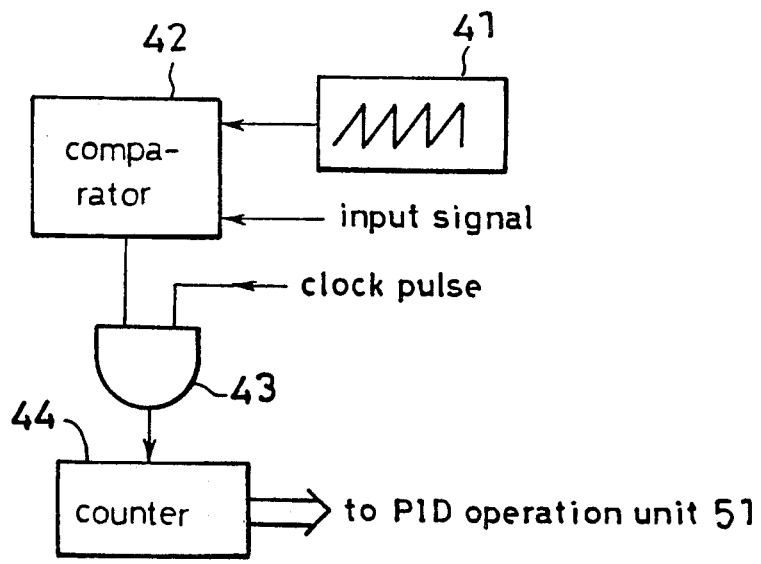
FIG. 2 is a block diagram illustrating an example of the circuit arrangement of an A/D converter 4 used in the electronic balance in FIG. 1.

As shown in FIG. 2, a practical circuit serving as the A/D converter 4 may comprise a saw-tooth wave generator 41 for supplying saw-tooth waves at predetermined cycles, a comparator 42 for receiving an output of the saw-tooth wave generator 41 and an output of the displacement sensor 14, an AND gate 43 for receiving an output of the comparator 42 and a clock pulse, and a counter 44 for counting the clock pulse passing through the AND gate 43. An output of the comparator 42 forms a pulse-width signal correlative to the magnitude of an input signal. By counting clock pulses with the pulse-width signal serving as a gate signal, digitalized data of a displacement detection signal is obtained every cycle of saw-tooth waves.

The digitalized displacement data is fetched by a PID operation unit 51 where the data is subjected to digital PID processings, i.e., proportion, integration and differentiation processings. Outputs of the PID operation unit 51 are sent, through a data processing unit 52, to a pulse duty converting unit 53, where a pulse duty signal is formed and sent to a pulse current generator 2. Provision is made such that an output of the data processing unit 52 is displayed, as a calculated value, on a display unit 6.

The pulse current generator 2 comprises a constant current generating circuit 21 and an electronic switch 22 adapted to be opened/closed according to a duty signal from the pulse duty converting unit 53. The pulse current generator 2 is to generate a pulse current which has a constant peak value based on an output current from the constant current generating circuit 21 and of which duty is corresponding to data from the pulse duty converting unit 53. The pulse current thus generated is supplied to the force coil 13. In other words, the pulse duty converting unit 53 basically supplies a duty signal of which ratio of H (high) and L (low) varies at predetermined cycles according to digital data from the data processing unit 52. By a duty signal from the pulse duty converting unit 53, the electronic switch 22 is turned ON/OFF. The electronic switch 22 is adapted to chop a direct current from the constant current generating circuit 21. Thus, a pulse current of which duty varies with output data from the data processing unit 52, flows in the force coil 13.

This embodiment is characterized in that, when it is supposed that the required resolution of the balance is set to 1/1,000,000 for example, a duty signal generated by the pulse duty converting unit 53 normally requires 20 bits but the duty signal in this embodiment has 16 bits. More specifically, when it is supposed that the frequency of a clock pulse in the pulse duty converter unit is equal to 30 MHz and the cycle of the pulse duty is equal to 2 milli-seconds, the inside value counted by the counter 44 is limited to 60,000 counts which is roughly equal to 16 bits. The shortage of the number of bits is compensated by periodically increasing or decreasing the duty signal as discussed later. Accordingly, a pulse current substantially having high resolution flows in the force coil 13.

Based on the temperature of a permanent magnet (not shown) in the magnetic circuit as detected by a temperature sensor 15 disposed in the balance mechanism 1, temperature compensation is given for a current generated by the constant current generating circuit 21 such that the current varies at a rate equal to that of variation of the magnetic field strength in the magnetic circuit.

The following description will discuss in detail the operation of the embodiment above-mentioned with reference to an ON/OFF timing chart of the electronic switch 22 shown in FIG. 3 (waveforms of a pulse duty signal from the pulse duty converting unit 53).

As mentioned earlier, the pulse duty converting unit 53 merely generates a duty signal having 16-bit resolution. Accordingly, when this signal is processed, the subsequent data to data 5000 H for example is 5001 H. On the other hand, the balance is required to have resolution of 20 bits for example.

As shown in FIG. 3 (A) and (B), the duty of a pulse duty signal for forming data 5001 H is increased by a width t corresponding to the 16-bit resolution, as compared with that for 5000 H. For the convenience of description, the pulses in 5000 H and the pulses in 5001 H in FIG. 3 are respectively designated by A and B.

By way of explanation, it is presumed that the period of control time is a period for allowing 16 pulses to flow through the force coil.

For example, when forming a hexadecimal digit of 50001 H using a signal having such resolution, the pulse duty converting unit 53 generates fifteen pulses A of 5000 H and one pulse B of 5001 H during one cycle of sixteen pulse generations, as shown in FIG. 3 (C). For generating 50002 H, the pulse duty converting unit 53 generates fourteen pulses A and two pulses B during one cycle of sixteen pulse generations. For generating 50008 H, the pulse duty converting unit 53 generates eight pulses A and eight pulses B during one cycle of sixteen pulse generations as shown in FIG. 3 (D). When the pulse B having a large width is generated a plurality of times during one cycle of sixteen pulse generations, it is advantageous in view of filtering to disperse the pulses B at regular time intervals during one cycle as shown in FIG. 3. More specifically, when the movable unit including the load receiving member 12 is vibrated due to a pulse current flowing in the force coil 13, it is more advantageous that the pulse current flows as averaged in the manner above-mentioned. Further, generating the pulses at regular time intervals above-mentioned is advantageous in view of less occurrence of ripples at the time of filtering even though there is adopted a system in which the pulse current is passed through a filter circuit, causing the pulse current to be converted into a direct current, which flows in the force coil 13.

Supplied to the force coil 13 is the pulse current above-mentioned which is generated as chopped based on the pulse duty signal and which has an effective current value equivalently equal to the weight of a load. Accordingly, when the balance mechanism 1 is brought in equilibrium, an output of the A/D converter 4 is equal to 0 or a predetermined reference value. (For example, one half of the counted value on full scale would be preferable when the A/D converter which does not measure a minus value is used.) Thus, the number of bits, lineality, span variations and the like of the A/D converter 4 can be disregarded. That is, the A/D converter 4 is required to work until the balance mechanism 1 is brought in equilibrium. Accordingly, only zero stability is important in the A/D converter 4.

In the embodiment above-mentioned, the description has been made of the system where the displacement sensor 14 of the analog type is used and an output thereof is converted into digital data. However, the sensor is not limited to one of the analog type. For example, a CCD line sensor 140 of the digital type as shown in FIG. 4 may be used as the displacement sensor. In this case, the A/D converter 4 becomes unnecessary. Further, when such a digital displacement sensor for receiving an optical signal is used, it is preferable to optically magnify an optical signal which varies with a displacement of the load receiving member 12, and to guide the signal thus magnified to the sensor. Because the minimum remaining displacement due to the resolution of a displacement sensor can be narrowed, it works well enough to a higher sensitive balance. As the digital displacement sensor, any of the following sensors may also be used in addition to the sensor of the type using an optical signal; a sensor in which a capacitor of the parallel plate type secured to the load receiving member 12 and to the stationary portion of the balance mechanism, is adapted to be changed in capacity by a displacement of the load receiving member 12, so that an oscillation circuit including the capacitor is changed in oscillation frequency, which is used as an output of the sensor; and a sensor in which a coil and a ferrite core are respectively secured to the stationary portion of the balance mechanism and the load receiving member, and the coil is adapted to be changed in inductance by a displacement of the load receiving member, so that an oscillation circuit including the coil is changed in oscillation frequency, which is used as an output of the sensor.

As apparent from the description thus made, all the PID operations are not necessarily executed in a digital manner, but the present invention may be arranged such that the PID operations are wholly or partially executed in an analog manner.

Figure 5:
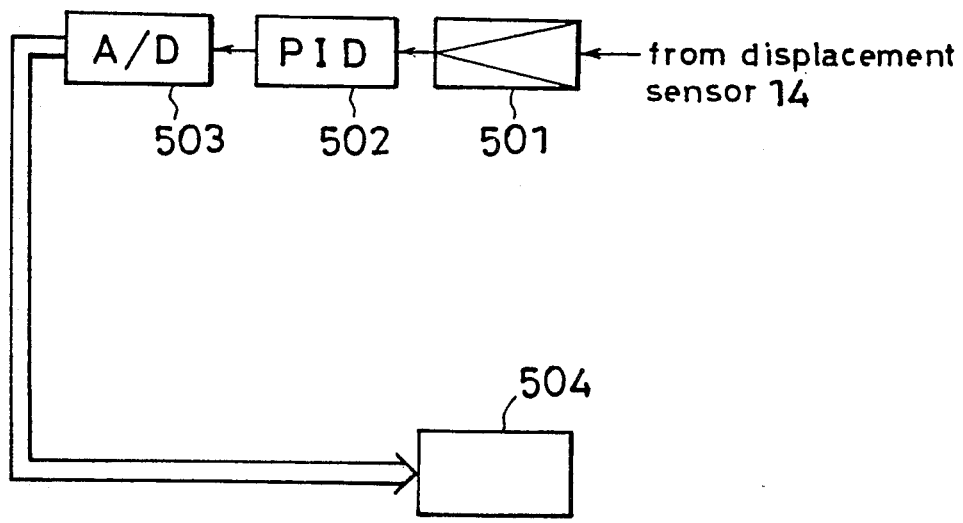
FIG. 5 is a block diagram illustrating the arrangement of the main circuit of electronic balance in accordance with a further embodiment of the present invention.

FIG. 5 is a block diagram illustrating the arrangement of the main circuit of electronic balance according to a further embodiment of the present invention.

In this embodiment, an output of a displacement sensor 14 of the analog type is amplified by an amplifier 501 and then processed by an analog PID operation circuit 502, and an output of the PID operation circuit 502 is digitalized by an A/D converter 503 and then sent to a microcomputer 504. Then, the microcomputer 504 generates a pulse duty signal, as mentioned earlier, based on the digital data. In this embodiment, other arrangements are the same as those in the embodiment shown in FIG. 1.

Figure 6:
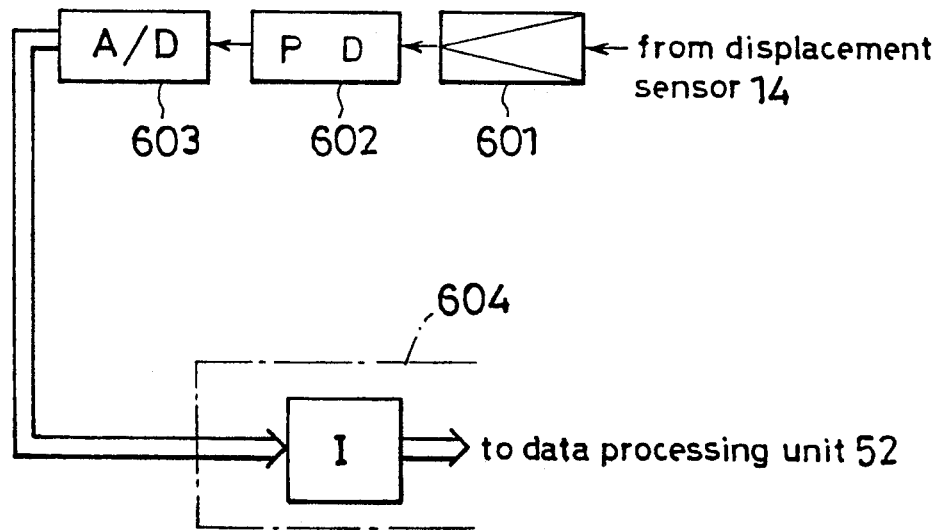
FIG. 6 is a block diagram illustrating the arrangement of the main circuit of electronic balance in accordance with still another embodiment of the present invention.

FIG. 6 shows a block diagram illustrating the arrangement of the main circuit of electronic balance according to still another embodiment of the present invention.

In this embodiment, an output of a displacement sensor 14 of the analog type is amplified by an amplifier 601 and then processed by an analog PD operation circuit 602. An output of the PD operation circuit 602 is digitalized by an A/D converter 603 and then sent to a microcomputer 604. In the microcomputer 604, the digital data is integrated by a digital operation to form a PID signal. The PID signal is then converted into a pulse duty signal as mentioned earlier in the same manner as mentioned earlier.

The arrangement shown in FIG. 6 may be modified such that an output of the amplifier 601 is sent to an analog PD operation circuit 602 and at the same time, the output of the amplifier 601 is digitalized and sent to the microcomputer 604. In the microcomputer 604, the digitalized data is subjected to an integration processing. The integration result data is composed with data as obtained by digitalizing the result of the analog PD operation.

It is a matter of course that, according to the present invention, there may be used, instead of the PID operations, other known automatic control processings equivalent to the PID operations.

What is claimed is:

1. An electronic balance comprising:
    a force coil disposed in a magnetic field, the force coil operating an electromagnetic force when a current flows therethrough;
    a plate for placing a load weight to be weighed;
    a load receiving member for supporting the plate;
    pulse generating means for generating a pulse current having a duty cycle which is determined based on input data, said pulse current being supplied to the force coil;
    data processing means for processing and converting a signal representing a displacement of the load receiving member caused by the placement of the load weight on the plate by PID operation processing into duty cycle data having a predetermined number of bits for each predetermined period of control time, and then supplying the duty cycle data to the pulse current generating means; and
    mass value determining means for converting the duty cycle of said pulse current supplied to the force coil into a mass value and supplying same to a display unit, thereby ensuring that the pulse current flowing through the force coil contains two different duty cycles for each predetermined period of control time, and the duty cycle data is determined so that the generated electromagnetic force is brought into equilibrium with the load weight on the plate.

2. An electronic balance according to claim 5, wherein automatic control processings are executed by digital operations using data as obtained by digitalizing the displacement detection signal through A/D conversion.

3. An electronic balance according to claim 5, wherein the PID operation processings are executed by analog operations of the displacement detection signal, and the operation results are digitalized and then supplied to the data processing unit.

4. An electronic balance according to claim 5, wherein a processing equivalent to at least the integration processing out of automatic control processings is executed by a digital operation, and other processings are executed by analog operations.

* * * * *